US011371652B1

(12) United States Patent
Walker et al.

(10) Patent No.: US 11,371,652 B1
(45) Date of Patent: Jun. 28, 2022

(54) POLE MOUNTING SYSTEM FOR LOCKABLE KEY HOUSING (71) Applicants: Marion Kelly Walker, Rogers, AR (US); David Lee McClure, Rogers, AR (US)

(72) Inventors: Marion Kelly Walker, Rogers, AR (US); David Lee McClure, Rogers, AR (US)

( * ) Notice: Subject to any disclaimer, the term of this patent is extended or adjusted under 35 U.S.C. 154(b) by 0 days.

(21) Appl. No.: 17/098,973

(22) Filed: Nov. 16, 2020

Related U.S. Application Data (63) Continuation-in-part of application No. 29/659,702, filed on Aug. 10, 2018, now Pat. No. Des. 902,021.

(51) Int. Cl.
| | |
|---|---|
| *F16L 3/02* | (2006.01) |
| *F16L 3/08* | (2006.01) |
| *F16L 3/12* | (2006.01) |
| *F16M 13/00* | (2006.01) |
| *B65D 63/00* | (2006.01) |
| *F16M 11/00* | (2006.01) |
| *F16M 13/02* | (2006.01) |
| *F16M 11/04* | (2006.01) |
| *F16B 2/06* | (2006.01) |
| *F16L 3/237* | (2006.01) |

(52) U.S. Cl.
CPC .......... *F16M 13/022* (2013.01); *F16B 2/065* (2013.01); *F16M 11/04* (2013.01); *F16L 3/02* (2013.01); *F16L 3/237* (2013.01)

(58) Field of Classification Search
CPC ....... F16M 13/022; F16M 11/04; F16B 2/065; F16L 25/24; F16L 3/02; F16L 3/08; F16L 25/04; F16L 3/237; F01N 13/1805
See application file for complete search history.

(56) References Cited

U.S. PATENT DOCUMENTS

| 3,879,815 | A | * | 4/1975 | Dowling | F16B 2/08 24/277 |
| 4,056,869 | A | * | 11/1977 | Eisma, Jr. | F01N 13/1805 24/277 |
| 4,249,759 | A | * | 2/1981 | Heckethorn | F01N 13/1805 24/277 |
| 4,372,017 | A | * | 2/1983 | Heckethorn | F01N 13/1805 24/277 |
| 4,488,334 | A | * | 12/1984 | Goforth | F16L 25/04 24/277 |
| 4,489,463 | A | * | 12/1984 | Schafer | F16L 37/08 24/277 |

(Continued)

*Primary Examiner* — Tan Le
(74) *Attorney, Agent, or Firm* — Schrantz Law Firm, PLLC; Stephen D. Schrantz (57) ABSTRACT

The mounting system and device secures a container, such as a lockable container to a pole. A housing restricts access to the fasteners and other attachments that secure the container to the pole. A unitary fastener, such as a U-bolt, secures the housing to the pole. The two ends of the unitary fastener enter a first section of a rear wall and a second section of the rear wall to attach to the housing at an interior attachment surface. A curvature in the rear wall separates the first section and the second section of the rear wall. The curvature of the rear wall contacts the pole. The housing, the guard plate, and the container cover the fasteners to reduce access to the fasteners.

20 Claims, 7 Drawing Sheets

(56) References Cited

U.S. PATENT DOCUMENTS

| | | | | |
|---|---|---|---|---|
| 5,274,888 A | * | 1/1994 | Payne | F16L 3/02 |
| | | | | 24/277 |
| 7,681,982 B2 | * | 3/2010 | Suzuki | B41J 2/16523 |
| | | | | 347/36 |
| 2008/0283687 A1 | * | 11/2008 | McClure | F16L 3/237 |
| | | | | 248/74.1 |

* cited by examiner

POLE MOUNTING SYSTEM FOR LOCKABLE KEY HOUSING

CROSS-REFERENCE TO RELATED APPLICATIONS

This application claims priority to and is a continuation in part of U.S. patent application Ser. No. 29/659,702 filed on Aug. 10, 2018 entitled POLE MOUNTING SYSTEM FOR LOCKABLE KEY HOUSING which is hereby incorporated by reference.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

The present invention relates generally to a device and system for securing a container to a pole. More specifically, the present invention relates to a pole mount device and system for securing a lockable container, such as a lockable key box or emergency key box. The present invention secures the container while limiting access to the fasteners and other attachments that secure the container to the pole. The present invention provides mounting apertures that accept fasteners to secure the container. The housing of the present invention covers the fasteners to reduce access to the fasteners.

Known attachments exist for mounting containers. However, none of these mounts secure the container to a pole and reduce access to the fasteners that secure the container.

The present invention also provides mounting for signage that indicates the location of tools, instruments, systems and other areas of importance for first responders. The signage assists the first responders in locating the important item/device for responding to the emergency.

Description of the Known Art

The known art provides a mounting kit for securing lockable containers to a wall or other flat surface. The known art does not provide a device or system for restricting access to fasteners that secure the container to a pole or other curved surface.

SUMMARY OF THE INVENTION

The mounting system and device of the present invention secures a container to a pole or other curved surface. More specifically, the mounting system secures a lockable container, such as a lockable key box or emergency key box. The present invention secures the container while limiting access to the fasteners and other attachments that secure the container to the pole or other curved surface.

A unitary fastener, such as a U-bolt, secures a housing to the pole. The two ends of the unitary fastener enter a first section of a rear wall and a second section of the rear wall. A curvature in the rear wall separates the first section and the second section of the rear wall. The curvature of the rear wall contacts the pole.

The unitary fastener, such as the U-bolt, passes partially around the pole and attaches to the housing to secure the housing to the pole. The unitary fastener has two threaded ends, a first end that enters the first section, and a second end that enters the second section. The two ends secure to the housing such that the pole is positioned between the housing and the unitary fastener. A fastener body, such as a nut, secures the U-bolt to the housing.

The housing provides an aperture to access the nuts for tightening and/or loosening the nuts on the U-bolt. Additional fasteners extending longitudinally forward from the housing secure a guard plate to the housing. The guard plate covers the apertures to secure the connection of the housing to the pole. The guard plate restricts access to the nuts on the U-bolt.

The container then secures to the fasteners extending longitudinally from the housing and the guard plate. The fasteners are arranged to mate with the container. Different configurations may be required depending on the type and style of container.

The housing secures to a lockable container. Such a lockable container includes a lockable key box or emergency key box. Additional nuts within the container secure the container to the fasteners extending from the housing. The placement of the nuts within the container limits removal of the container from the housing.

The housing, the guard plate, and the container cover the fasteners to reduce access to the fasteners. Reducing access to the fasteners limits the ability to remove the housing and container from the pole. Such security limits unwanted access to the container and the contents of the container.

It is an object of the present invention to secure a container to a pole or other curved surface.

It is another object of the present invention to limit access to the container.

It is another object of the present invention to limit removal of the container.

It is another object of the present invention to increase the difficulty of removing the container from the pole.

It is another object of the present invention to limit access to the fasteners that secure the container to the pole.

It is another object of the present invention to cover the fasteners that secure the container to the pole.

It is another object of the present invention to provide a mounting system for a lockable container.

It is another object of the present invention to identify locations of tools and equipment available for first responders, such as firemen.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
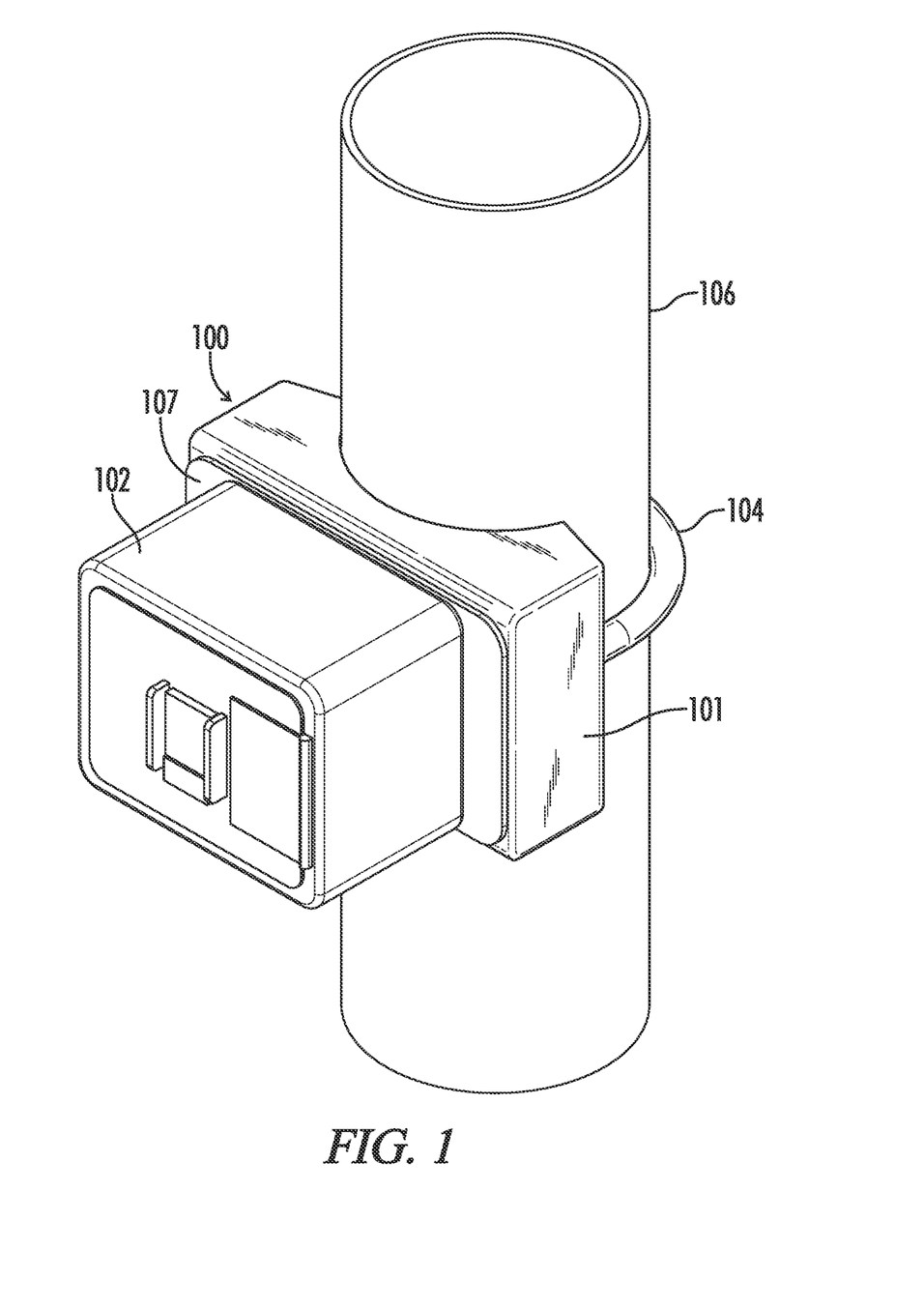
FIG. 1 is an environmental view of one embodiment of the present invention.

Referring to FIG. 1, the mounting system, generally shown as 100, attaches to a pole 106. A container 102 attaches to the housing 101 of the mounting system 100. A guard plate 107 placed between the container 102 and the housing 101 restricts access to the fasteners that secure the mounting system 100 and housing 101 to the pole 106. The fasteners that secure the container 102 to the housing 101 are located within the housing 101 and the container 102. Such fasteners are accessed through the container 102. Locking the container 102 limits access to the fasteners that secure the container 102 to the housing 101.

In one embodiment, the housing 101 secures an entry system, such as an emergency entry system, to a pole. The entry systems, such as emergency entry systems, provide a lockable container that stores keys or other entry or access devices to gain access to a building or other structure. Known emergency systems provide mounting patterns for securing to a wall or other flat surface. The known emergency systems do not secure to a curved pole.

The combination of the housing 101, guard plate 107, and housing 102 of the present invention limit access to the fasteners. As shown in FIG. 1, the U-bolt 104 is partially exposed. However, the portions for removing the U-bolt 104 are not exposed.

The system 100 attaches to a curved surface, such as pole 106. The U-bolt 104 secures the housing 101 around the pole 106. The housing provides a rear wall with a curved surface that abuts the outer surface of the pole 106. The curvature of the rear wall of the housing 101 may vary according to the size of the pole 106 to which the housing 101 attaches. Similarly, the size and curvature of the U-bolt 104 varies according to the size and diameter of the pole 106.

A fastener 104, such as a U-bolt, provides a single fastener that partially encompasses the pole 106. The U-bolt 104 connected to the housing 101 encompasses the pole 106 to secure the housing 101 and the container 102 to the pole 106. The guard plate 107 and the container 102 cover the fasteners that secure the housing 101 to the pole 106. The guard plate 107 and container 102 also cover the fasteners that secure the container 102 to the housing 101.

Figure 2:
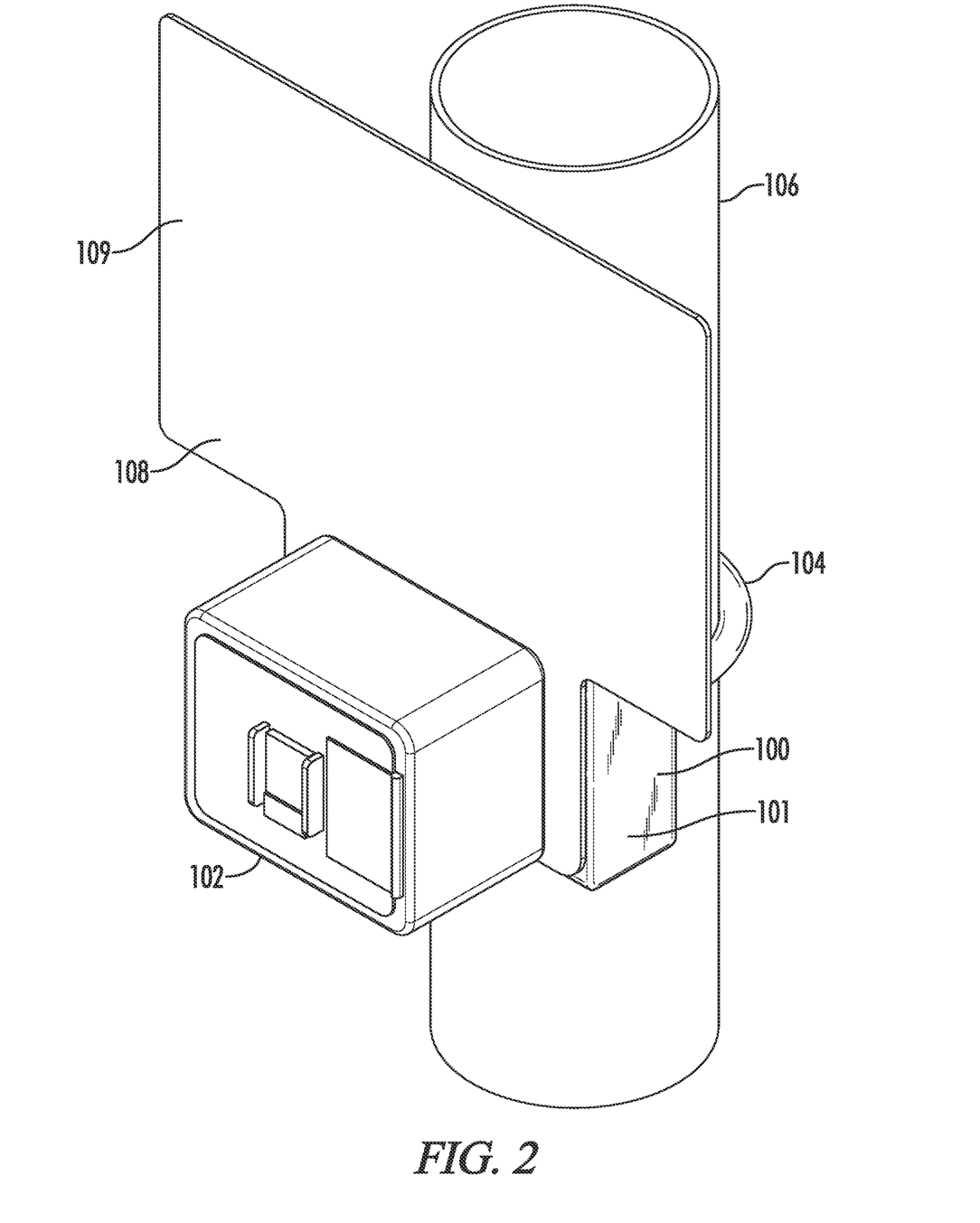
FIG. 2 is an environmental view of one embodiment of the present invention.

FIG. 2 shows the attachment of the system 100 to the pole 106 via the U-bolt 104. Guard plate 108 restricts access to the fasteners similarly to guard plate 107 shown in FIG. 1. The guard plate 108 and the container 102 cover the fasteners that secure the housing 101 to the pole 106. The guard plate 107 and container 102 also cover the fasteners that secure the container 102 to the housing 101.

Guard plate 108 varies from guard plate 107 due to the facing 109 extending externally of the container 102. The facing 109 provides a surface for placing signage or other indicator that identifies any equipment or other systems of importance to a first responder. The facing 109 may identify an FDC, such as Fire Department Connection, hazard identifiers, contact information, building hazard codes, emergency information, shut off valve information, or any other information. The facing 109 provides area to place any type of sign or message to be viewable by others.

Figure 3:
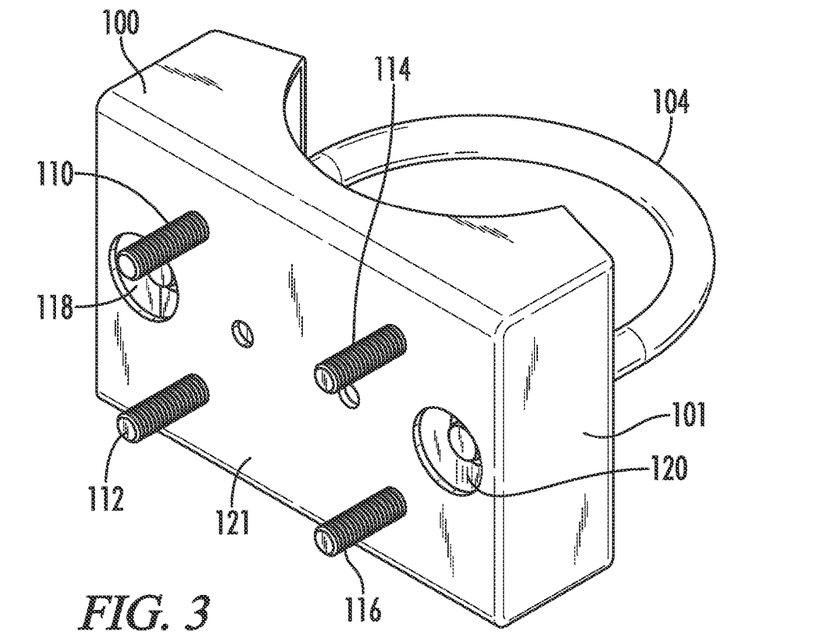
FIG. 3 is a front perspective view of one embodiment of the present invention.

FIG. 3 shows a front perspective view of a front wall 121 of the housing 101. Access apertures 118, 120 provide openings in the front wall 121. Nuts inserted through the access apertures 118, 120 secure the U-bolt 104 to the housing 101. A nut attaches to each end of the U-bolt 104 to secure the U-bolt 104 to the housing 101.

The nuts and the U-bolt 104 are recessed within the access apertures 118, 120 to limit access to the nuts. The nuts are located longitudinally behind the front wall 121 to allow for attachment of the guard plate. The guard plate covers the access apertures 118, 120 to limit access to the nuts. The guard plate has a mounting pattern of attachment apertures to align with attachment apertures of the container. The mounting pattern of the attachment apertures varies according to the type of container that attaches to the housing 101.

Both the guard plate and the container attach at the front wall of the housing 101. Fasteners 110, 112, 114, 116 extend longitudinally forward from the front wall 121. The mounting pattern of the attachment apertures of the guard plate and the container match the arrangement of the fasteners 110, 112, 114, 116.

Fasteners 110, 112, 114, 116 secure the guard plate and the container to the housing 101. The guard plate is placed upon fasteners 110, 112, 114, 116 prior to placing the container. Nuts attach to the fasteners 110, 112, 114, 116 within the container to secure the container and guard plate to the housing. Closing and locking the container restricts access to the nuts attached to fasteners 110, 112, 114, 116 within the container.

Figure 4:
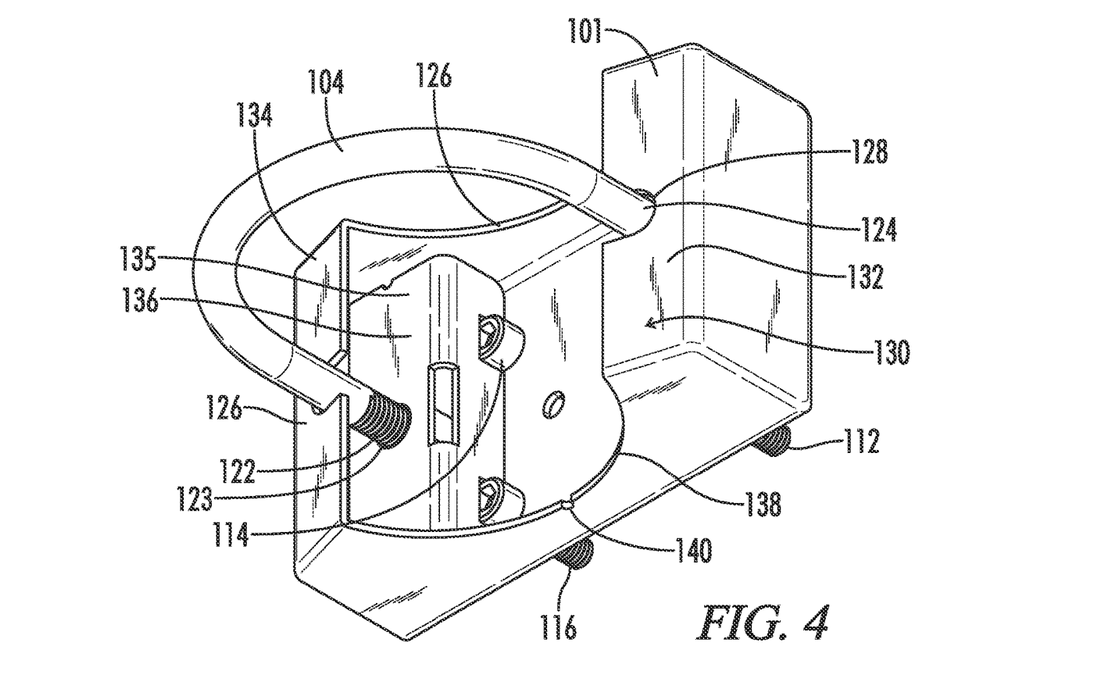
FIG. 4 is a rear perspective view thereof.
Figure 5:
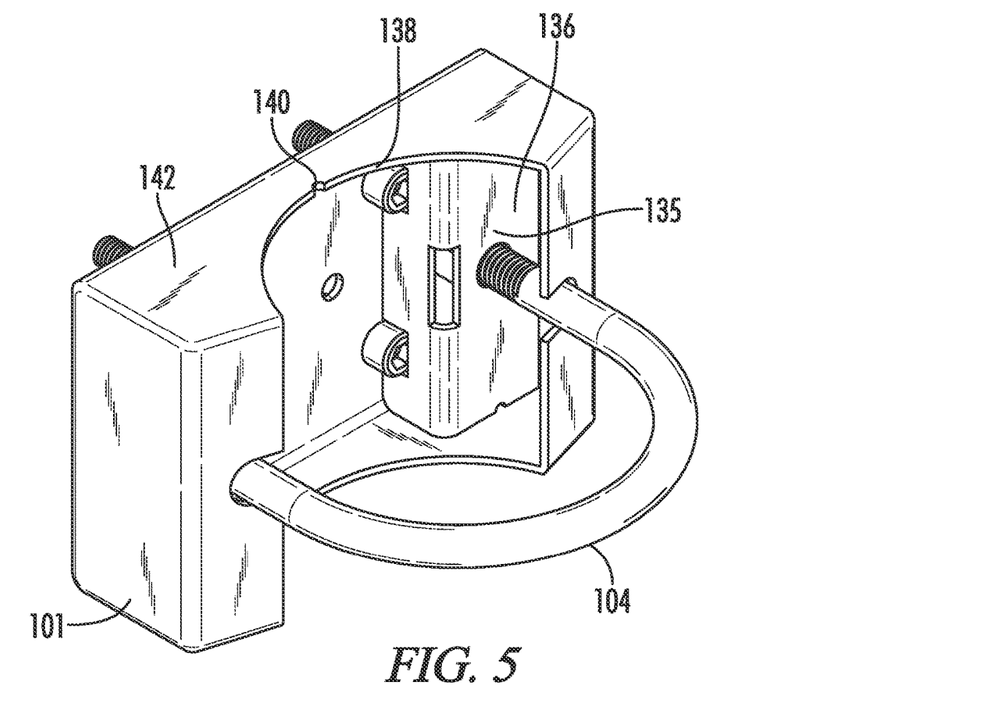
FIG. 5 is a rear perspective view thereof.

FIGS. 4 and 5 show a rear perspective view of the housing 101. Rear wall 130 provides wall sections 132, 134 that are angled rearward at an obtuse angle from the side walls. Angling rear wall sections 132, 134 abuts the pole to limit access through the rear of the housing 101. Each wall section 132, 134 provides an insertion aperture 126, 128 for accepting U-bolt 104. The U-bolt inserts into the Interior opening 123. Each fastener end 122, 124 inserts into an interior openings 123 in the interior attachment surface 135. Interior attachment surface 135 is located between the rear wall 130 and the front wall.

The interior attachment surface 135 also provides openings for fasteners 110, 112, 114, 116 as shown for fasteners 114, 116. The interior attachment surface 135 provides interior attachment walls 136, 137 located on both the right side and left side of the housing for attachment of the U-bolt 104. Nuts located on the other side of interior attachment surface 135 secure the U-bolt 104 to the housing 101.

The rear wall 130 also provides a rear curve 138 located at the bottom wall and top wall at the rear of the housing between the wall sections 132, 134. The rear curve 138 abuts the pole when the housing attaches to the pole Drain aperture 140 located on the bottom wall 142 of the rear curve 138 allows water, fluid, and other debris to drain from the interior of the housing.

Figure 6:
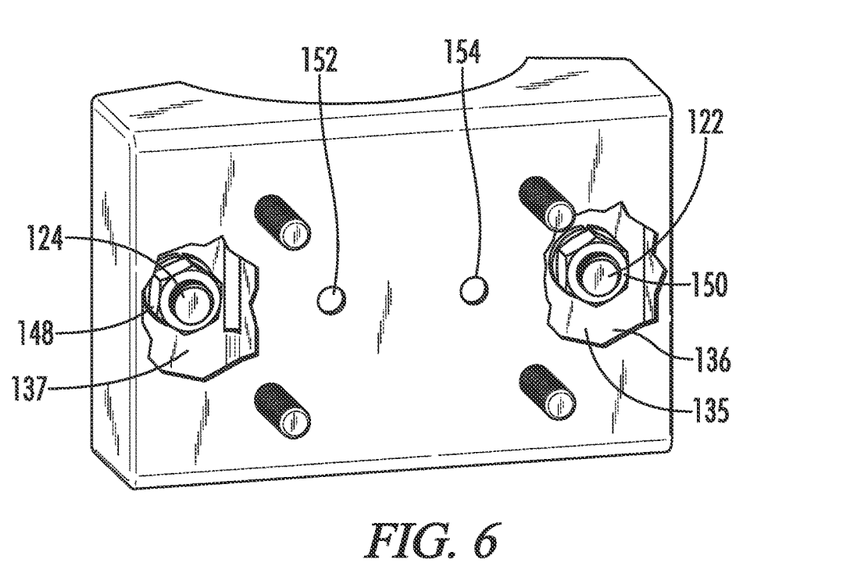
FIG. 6 is a partial perspective view thereof.
Figure 8:
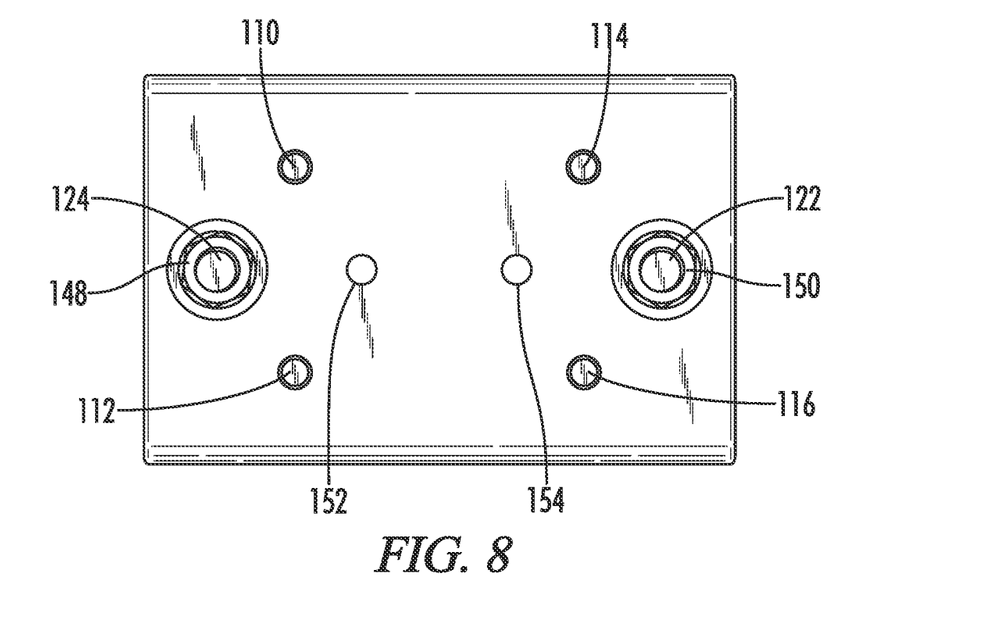
FIG. 8 is a front view thereof.

FIGS. 6 and 8 show the fasteners such as the nuts 148, 150 secured to the threaded ends 122, 124 of the U-bolt 104. The ends 122, 124 of the U-bolt 104 pass through the interior apertures of the interior attachment surface 135, having interior attachment walls 136, 137. The nuts 148, 150 tighten against the walls 136, 137 to secure the U-bolt 104 to the housing 101.

Tamper apertures 152, 154 provide openings for installing a tamper switch within the container. The tamper apertures 152, 154 allow wiring to pass through the tamper apertures to install the tamper switch within the container.

Figure 7:
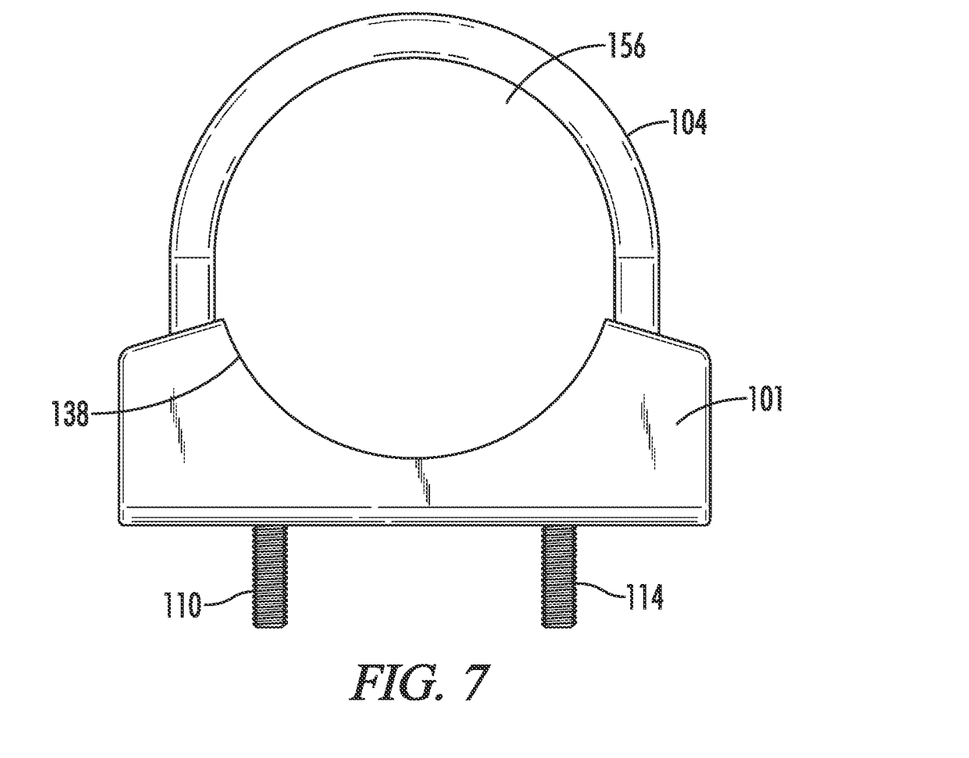
FIG. 7 is a top view thereof.
Figure 9:
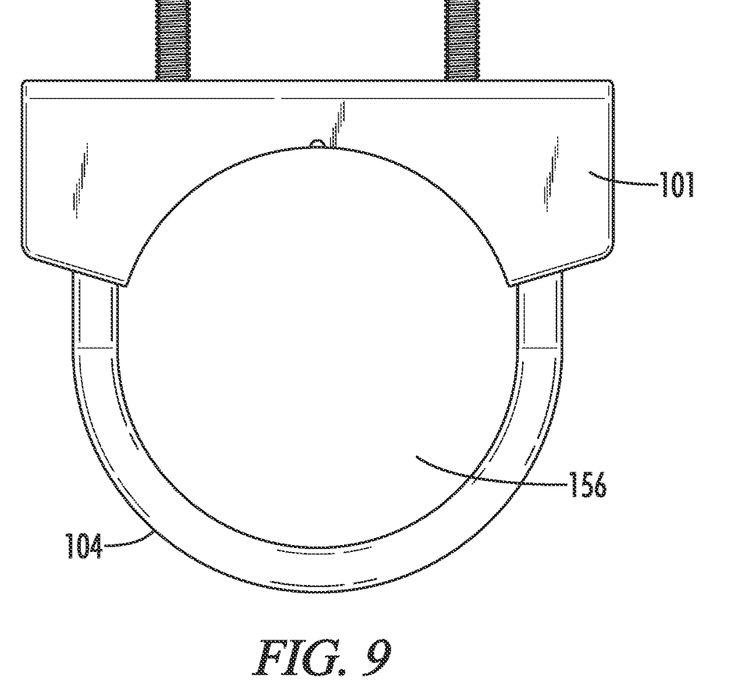
FIG. 9 is a bottom view thereof.

FIGS. 7 and 9 show the top and bottom views of the housing 101 with the U-bolt 104 attached. The U-bolt 104 and the rear curve 138 form opening 156 for placement of the U-bolt 104 and housing 101 around the pole. The rear curve 138 and the U-bolt 104 encompass the pole to secure the container and housing to the pole. The opening 156 is located longitudinally behind fasteners 110, 112, 114, 116 as shown in FIGS. 7, 9, and 10.

Figure 10:
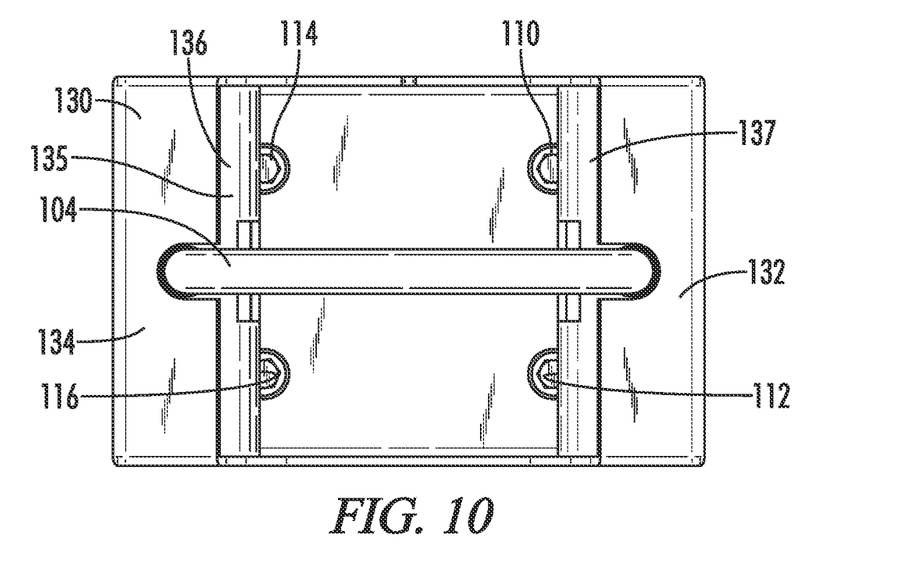
FIG. 10 is a rear view thereof.

FIG. 10 shows the placement of the fasteners 110, 112, 114, 116 in front of the interior attachment surface 135 and interior attachment walls 136, 137. Fasteners 110, 112, 114, 116 are located laterally interior of the interior attachment walls 136, 137. Interior attachment surface 135 extends laterally interior of rear wall sections 132, 134. Attaching the housing 101 to the pole restricts access to fasteners 110, 112, 114, 116 through the rear of the housing.

Figure 11:
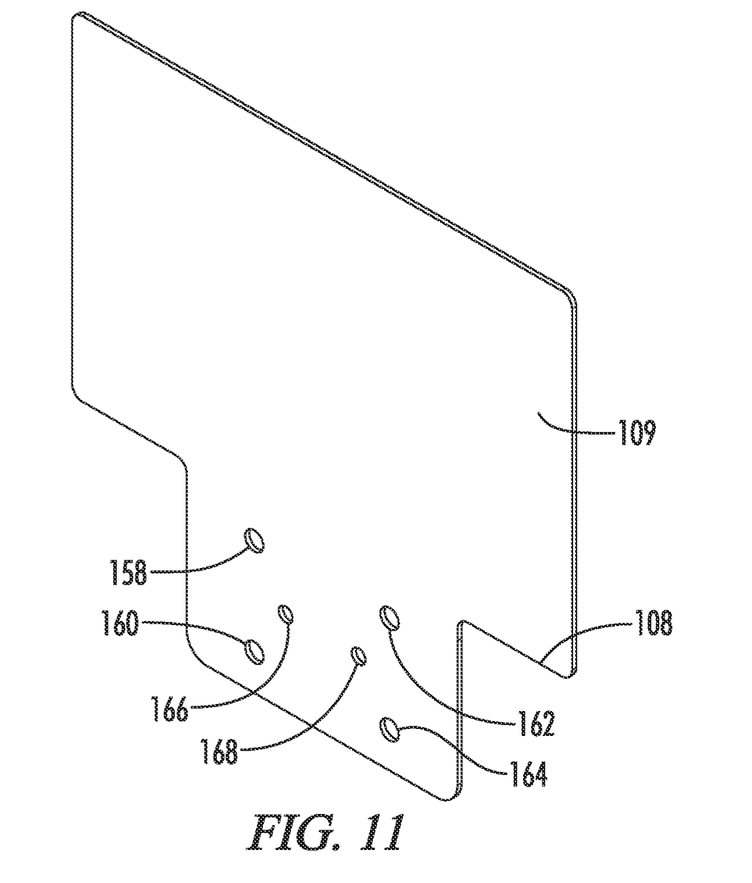
FIG. 11 is a perspective view of a guard plate of one embodiment of the present invention.
Figure 12:
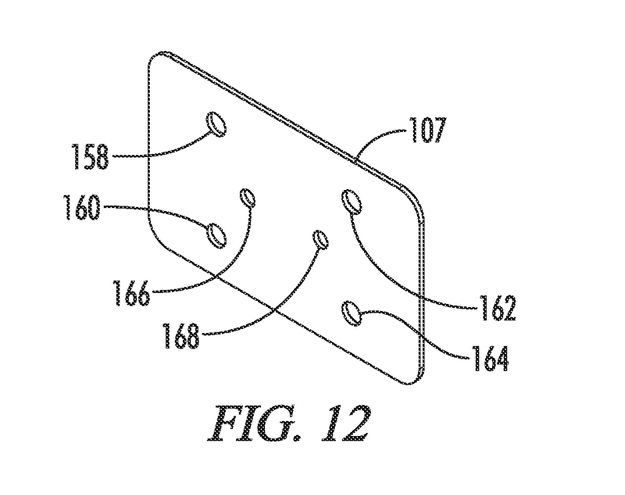
FIG. 12 is a perspective view of a guard plate of one embodiment of the present invention.

FIGS. 11 and 12 show the guard plates 107, 108 that secure to the housing between the housing and the container. The guard plates 107, 108 cover the ends of the U-bolt and the nuts that attach to the ends of the U-bolt. Guard plates 108, 108 also cover the access apertures in the front wall of the housing.

Guard plates 107, 108 vary due to the facing 109. Guard plate 108 provides facing 109 that allows for signage. Such signage may indicate important and/or relevant information, label particular equipment or systems, provide warnings, or provide other information.

Guard plates 107, 108 provide a number of different openings for attaching the guard plates 107, 108 to the housing and to install equipment, such as tamper switches within the container. The openings vary according to the orientation at which the system is installed, the type of container secured to the housing, and the mounting pattern required for the container.

Attachment apertures 158, 160, 162, 164 in the guard plates 107, 108 accept the fasteners extending longitudinally forward from the housing. The fasteners passing through attachment apertures 158, 160, 162, 164 secure the guard plate 107, 108 to the housing and the container. The attachment apertures 158, 160, 162, 164 align with attachment apertures in the container to allow the fasteners to pass through the attachment apertures 158, 160, 162, 164 of the guard plate 107, 108 and the container.

Tamper apertures 166, 168 align with the tamper apertures 152, 154 of the housing 101 shown in FIGS. 6 and 8. The wiring of a tamper switch pass through the tamper apertures 152, 154, 166, 168 to install a tamper switch within the container. While only a single tamper aperture is required, the housing and guard plate provide two tamper apertures to allow for different orientations of the guard plate and the housing. The tamper apertures 166, 168 align with the tamper apertures 152, 154 and apertures in the container to install the wiring for a tamper switch within the container.

The mounting system may be modified to include additional U-bolts, different configuration and/or number of fastener apertures, different mounting patterns. The size of the housing may vary according to the container that attaches to the housing. The size and curvature of the rear wall and the U-bolt(s) may also be modified to fit different sized poles or curved surfaces.

The system is constructed from a rigid material. The housing and guard plate may be constructed from metal, plastic, or other rigid material.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A mounting system for installing a container onto a pole using a U-bolt having a first attachment end and a second attachment end, the system comprising:
   a housing having a rear wall, right side wall, left side wall, and a front wall;
   a first rear wall section located on the rear wall;
   a second rear wall section located on the rear wall;
   a rear curve in the rear wall wherein the rear curve extends laterally between the first rear wall section and the section rear wall section, wherein the rear curve curves longitudinally forward toward the front wall;
   a first interior opening and a second interior opening, wherein the U-bolt secures to the housing at the first interior opening and the second interior opening;
   a first interior attachment wall located longitudinally between the rear wall and the front wall, wherein the first interior opening extends longitudinally through the rear wall and the first interior attachment wall, wherein the first attachment end of the U-bolt passes longitudinally through the rear wall and the first interior opening of the first interior attachment wall without passing through the front wall, wherein the first attachment end of the U-bolt secures to the first interior attachment wall longitudinally between the front wall and the first interior attachment wall.

2. The system of claim 1 further comprising:
   a first access aperture in the front wall, wherein the first access aperture aligns with the first interior opening in the first attachment wall to allow access to the U-bolt through the front wall, wherein the first access aperture is larger than the first interior opening at the first interior attachment wall.

3. The system of claim 1 wherein a nut attaches to the U-bolt to secure the U-bolt to the first interior attachment wall, wherein the nut secures to the first end of the U-bolt longitudinally between the first interior attachment wall and the front wall.

4. The system of claim 2 further comprising:
   a second interior attachment wall located longitudinally between the rear wall and the front wall, wherein the second interior opening extends longitudinally through the rear wall and the second interior attachment wall, wherein the second attachment end of the U-bolt passes longitudinally through the rear wall and the second interior attachment wall at the second interior opening without passing through the front wall, wherein the second attachment end of the U-bolt secures to the second interior attachment wall longitudinally between the front wall and the second interior attachment wall;

a second access aperture in the front wall, wherein the second access aperture aligns with the second interior opening at the second attachment wall to allow access to the U-bolt through the front wall, wherein the second access aperture is larger than the second interior opening at the second attachment wall.

5. The system of claim 4 wherein a first nut attaches to the U-bolt to secure the U-bolt to the first interior attachment wall, wherein a second nut attaches to the U-bolt to secure the U-bolt to the second interior attachment wall, wherein the first nut is located longitudinally between the first interior attachment wall and the front wall, wherein the second nut is located longitudinally between the second interior attachment wall and the front wall.

6. The system of claim 2 further comprising:
a first insertion aperture located in the first rear wall section, wherein the first insertion aperture accepts the U-bolt to guide the U-bolt to the first interior opening.

7. The system of claim 4 further comprising:
a first insertion aperture and a second insertion aperture located in the rear wall;
the first insertion aperture located in the first rear wall section wherein the first insertion aperture accepts the U-bolt to guide the U-bolt to the first interior opening; and
the second insertion aperture located in the second rear wall section wherein the second insertion aperture accepts the U-bolt to guide the U-bolt to the second interior opening.

8. The system of claim 1 further comprising:
fastener apertures extending longitudinally through the front wall, wherein fasteners pass longitudinally through the fastener apertures to secure the container to the front wall of the housing.

9. The system of claim 8 further comprising;
an access aperture in the front wall, wherein the access aperture aligns longitudinally with the first interior opening to allow access to the U-bolt through the front wall, wherein the fasteners secure a blocking wall that covers the access aperture, wherein the access aperture is larger than the first interior opening at the first attachment wall.

10. The system of claim 9 further comprising:
a guard plate that attaches to the front wall of the housing, wherein the guard plate is the blocking wall that covers the access aperture;
fastener apertures of the guard plate that align with the fastener apertures of the front wall, wherein the guard plate attaches between the front wall of the housing and the container.

11. A mounting system for installing a container onto a pole using a U-bolt, the system comprising:
a housing having a rear wall, first side wall, second side wall, and a front wall, wherein the rear wall is located longitudinally behind the front wall;
a first rear wall section located on the rear wall;
a second rear wall section located on the rear wall;
a rear curve in the rear wall wherein the rear curve extends laterally between the first rear wall section and the section rear wall section, wherein the rear curve curves longitudinally forward toward the front wall;
an interior attachment surface located longitudinally between the front wall and the rear wall, wherein the U-bolt connects to the interior attachment surface on a side of the interior attachment surface longitudinally between the front wall and the interior attachment surface, wherein the front wall attaches to a blocking wall that limits access to the interior attachment surface at which the U-bolt attaches to the interior attachment surface.

12. The system of claim 11 further comprising:
a first interior opening located in the interior attachment surface;
a second interior opening located in the interior attachment surface, wherein the U-bolt secures to the housing at the first interior opening and the second interior opening, wherein a first nut and a second nut attaches the U-bolt to the interior attachment surface, wherein the first nut is located longitudinally between the interior attachment surface and the front wall, wherein the second nut is located longitudinally between the interior attachment surface and the front wall.

13. The system of claim 11 wherein the U-bolt passes through the rear wall without attaching directly to the rear wall.

14. The system of claim 13 further comprising:
a first insertion aperture and a second insertion aperture located in the rear wall;
the first insertion aperture located in the first rear wall section wherein the first insertion aperture accepts the U-bolt to guide the U-bolt to the first interior opening; and
the second insertion aperture located in the second rear wall section wherein the second insertion aperture accepts the U-bolt to guide the U-bolt to the second interior opening.

15. The system of claim 11 further comprising:
fastener apertures extending longitudinally through the front wall, wherein fasteners pass longitudinally through the fastener apertures to secure the container to the front wall of the housing, wherein the fasteners pass into the container, wherein nuts within the container secure to the fasteners to secure the container to the front wall.

16. The system of claim 15 further comprising:
an access aperture in the front wall wherein the access aperture aligns with a first interior opening to allow access to the U-bolt through the front wall, wherein the blocking wall covers the access aperture when attached to the front wall.

17. The system of claim 16 further comprising:
a guard plate that attaches to the front wall of the housing, wherein the guard plate covers the access aperture;
fastener apertures of the guard plate that align with the fastener apertures of the front wall, wherein the guard plate attaches between the front wall of the housing and the container.

18. A mounting system for installing a container onto a pole using a U-bolt, the system comprising:
a housing having a rear wall, first side wall, second side wall, and a front wall, wherein the rear wall is located longitudinally behind the front wall;
a first rear wall section located on the rear wall;
a second rear wall section located on the rear wall;
a rear curve in the rear wall wherein the rear curve extends laterally between the first rear wall section and the section rear wall section, wherein the rear curve curves longitudinally forward toward the front wall;
an interior attachment surface located longitudinally between the front wall and the rear wall, wherein the U-bolt connects to the interior attachment surface;

fastener apertures extending longitudinally through the front wall, wherein fasteners pass longitudinally through the fastener apertures to secure the container to the front wall of the housing, wherein the fasteners pass through the front wall into the container, wherein nuts within the container secure to the fasteners to secure the container to the front wall.

19. The system of claim 18 further comprising:

a first interior opening located in the interior attachment surface;

a second interior opening located in the interior attachment surface, wherein the U-bolt secures to the housing at the first interior opening and the second interior opening, wherein a first nut and a second nut attaches the U-bolt to the interior attachment surface, wherein the first nut secures to the U-bolt longitudinally between the interior attachment surface and the front wall, wherein the second nut secures to the U-bolt longitudinally between the interior attachment surface and the front wall;

an access aperture in the front wall, wherein the access aperture aligns longitudinally with the first interior opening to allow access to the U-bolt through the front wall, wherein the access aperture is larger than the first interior opening at the interior attachment surface.

20. The system of claim 18 wherein the interior attachment surface extends laterally inward towards a center of the housing laterally past the first rear wall section.

\* \* \* \* \*